United States Patent [19]

Takahashi et al.

[11] Patent Number: 5,184,766

[45] Date of Patent: Feb. 9, 1993

[54] ASSEMBLY LINE CONSTRUCTION AND METHOD FOR ASSEMBLING AUTOMOTIVE VEHICLE BODIES

[75] Inventors: Sakae Takahashi; Mamoru Maezima; Yuji Takahashi, all of Hiroshima, Japan

[73] Assignee: Mazda Motor Corporation, Hiroshima, Japan

[21] Appl. No.: 677,563

[22] Filed: Mar. 29, 1991

[30] Foreign Application Priority Data

Mar. 31, 1990 [JP] Japan .................................. 2-85805

[51] Int. Cl.$^5$ ..................... B23K 37/04; B23K 37/047
[52] U.S. Cl. ......................................... 228/4.1; 228/47; 29/430
[58] Field of Search ..................... 228/175, 136, 47 A, 228/4.1; 29/430

[56] References Cited

U.S. PATENT DOCUMENTS

| 2,779,092 | 1/1957 | Gordon . | |
|---|---|---|---|
| 3,968,558 | 7/1976 | Sekine et al. . | |
| 4,470,717 | 9/1984 | Bruhnke et al. | 228/136 |
| 4,767,046 | 8/1988 | Kumagai et al. | 228/4.1 |
| 5,011,068 | 4/1991 | Stoutenburg et al. | 228/4.1 |

*Primary Examiner*—Kurt C. Rowan
*Assistant Examiner*—Jeffrey T. Knapp
*Attorney, Agent, or Firm*—Fish & Richardson

[57] ABSTRACT

An assembly line for assembling an automotive vehicle body contains a welding station disposed in the assembly line for welding a first member and a second member, each being an element for structuring the automotive vehicle body; and a temporarily assembling station for temporarily assembling the first member with the second member and forming a temporarily assembled body so disposed on the immediate upstream side of the welding station after alignment of the first member with the second member.

30 Claims, 20 Drawing Sheets

ASSEMBLY LINE CONSTRUCTION AND METHOD FOR ASSEMBLING AUTOMOTIVE VEHICLE BODIES

BACKGROUND OF THE INVENTION

1. Field of the Invention

The present invention relates to an assembly line construction and a method for assembling an automotive vehicle body.

2. Description of Related Art

The vehicle body of an automotive vehicle is assembled by welding a plurality of members and parts structuring the vehicle body, such as a floor panel, roof panel, side bodies and so on.

For instance, Japanese Patent Publication No. 21,827/1984 discloses a step of assembling side body sections and an underbody (floor) section, which involves conveying the side body sections and the underbody section separately into a welding station disposed in an assembly line for assembling the automotive vehicle body and welding them by means of welding robots in such a state that the side body sections and the underbody section are aligned or located in predetermined positions.

Heretofore, however, the following problems arise in aligning the side body sections and the underbody section in the welding station. As they are conveyed separately into the welding station, welding robots are caused to wait in a rest state unit work for conveying them into the welding station has been finished and they are ready to weld. This is disadvantageous in terms of work efficiency for welding robots. Further, the operation for conveying the side body sections and the underbody section into the welding station and for aligning them in the predetermined positions are intertwined with the welding operation for welding them in terms of the order of work, timing, etc., so that control is rendered complicate.

SUMMARY OF THE INVENTION

Therefore, the present invention has the object to provide an assembly line construction and a method for assembling an automotive vehicle body so adapted as to improve work efficiency in the welding station disposed in the assembly line for assembling automotive vehicle bodies as well as to simplify control over operation for the assembly line therefor.

In order to achieve the aforesaid object in one aspect, the present invention consists of the assembly line construction for assembling the automotive vehicle body comprises:

a welding station so disposed in an assembly line for assembling automotive vehicle bodies as to weld a first member to a second member, each structuring the automotive vehicle body; and a station so disposed on the immediate upstream side of the welding station for temporarily staying the first member and the second member after alignment in the given places and forming a temporary body by the first and second members.

In another aspect, the present invention is directed to an assembly method for assembling an automotive vehicle body by welding the first member and the second member by means of a welding robot, which comprises:

an aligning step for aligning the first member and the second member;

a temporarily assembling step for temporarily staying the first member and the second member which have been aligned and forming a temporarily assembled body; and a conveying step for conveying the temporarily assembled body to a welding station where the welding robot is disposed.

In accordance with the present invention, the arrangement for the assembly line construction and the assembly method provides the temporarily assembled body composed of the first and second members in the station disposed on the immediate upstream side of the welding station and the temporarily assembled body is then conveyed into the welding station. Therefore, the assembly operation for forming the temporarily assembled bodies in the temporarily assembling station and the welding operation in the welding station can be performed on the assembly line. Hence, the arrangement according to the present invention does not require the welding robots disposed in the welding operation to await in a rest position or condition during the operation for conveying and aligning the members in the welding station, unlike conventional welding operation, and it can weld the temporarily assembled body coming one after another in the welding station. This assembly line can improve work efficiency in the welding station to a great extent.

Further, the present invention can design the station in which the temporary assembly is performed, namely, in which the conveying and aligning are executed, without paying attention to the arrangement for the station in which the welding is implemented. Hence, a control system for the assembly line can be simplified because control over the welding operation can be made with only the welding operation taken into account, while control over the operation for temporarily forming the temporary assembly body can be made with only this operation taken into account.

Other objects, features and advantages of the present invention will become apparent in the course of the description of the preferred embodiments, which follows, in conjunction with the accompanying drawings.

DESCRIPTION OF THE PREFERRED EMBODIMENTS

Figure 1:
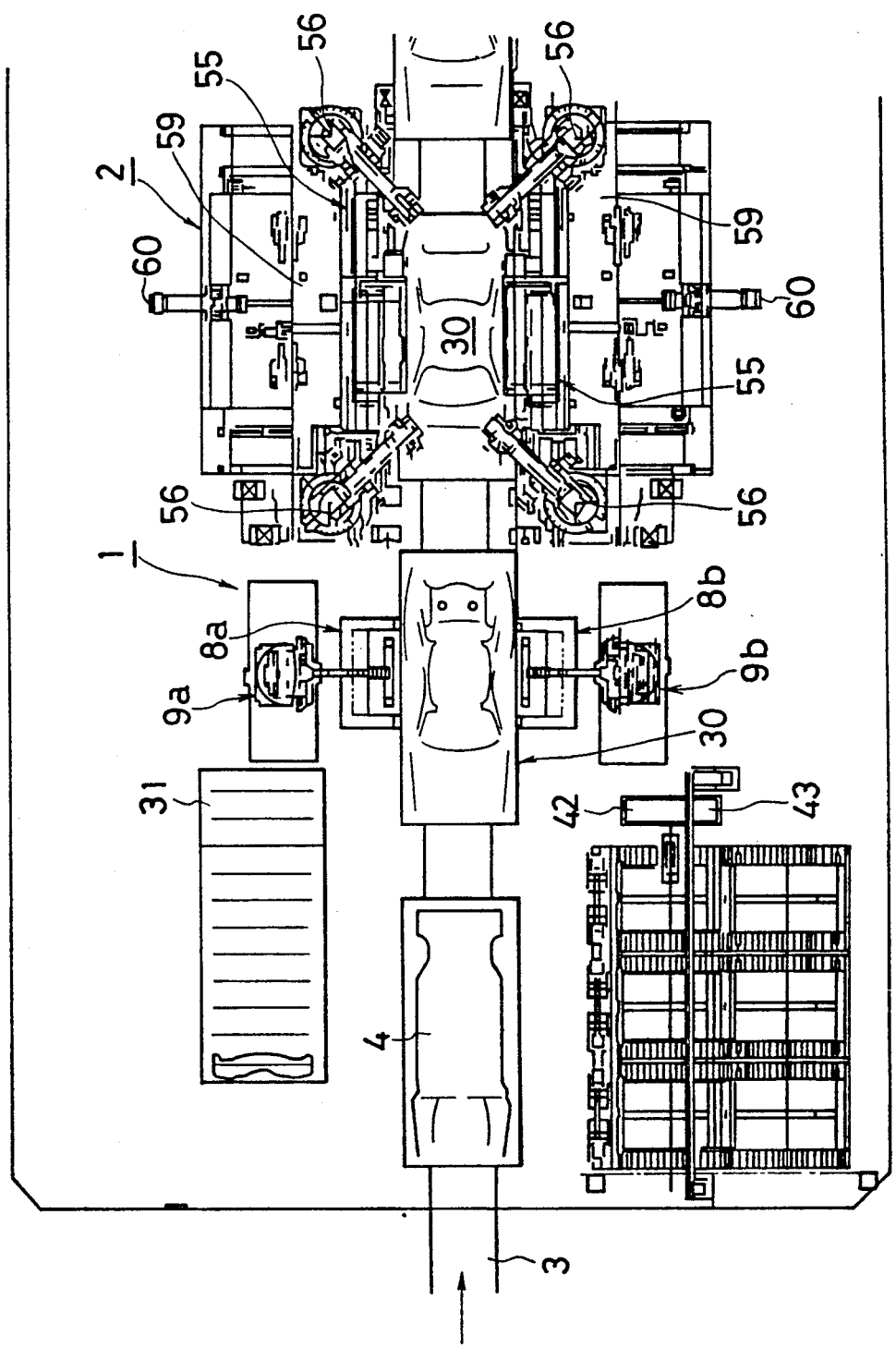
FIG. 1 is a plan view showing an embodiment of the present invention.
Figure 2:
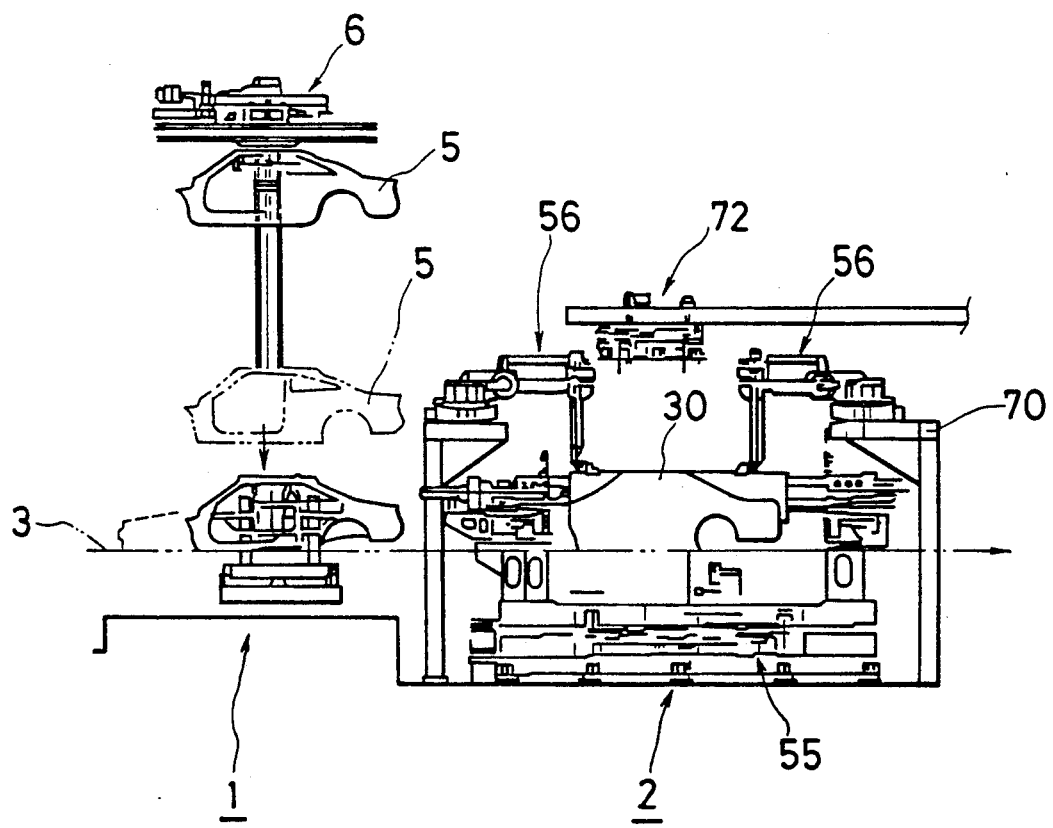
FIG. 2 is a plan view showing the embodiment of the present invention.

FIGS. 1 and 2 show a portion of the assembly line for assembling automotive vehicle bodies. The assembly line has a first station 1 and a second station 2 disposed on the upstream side and on the downstream side thereof along the direction in which parts of the automotive vehicles bodies travel. Between the first station 1 and the second station 2 extends a shuttle feeder 3 as a conveyor means.

Figure 3:
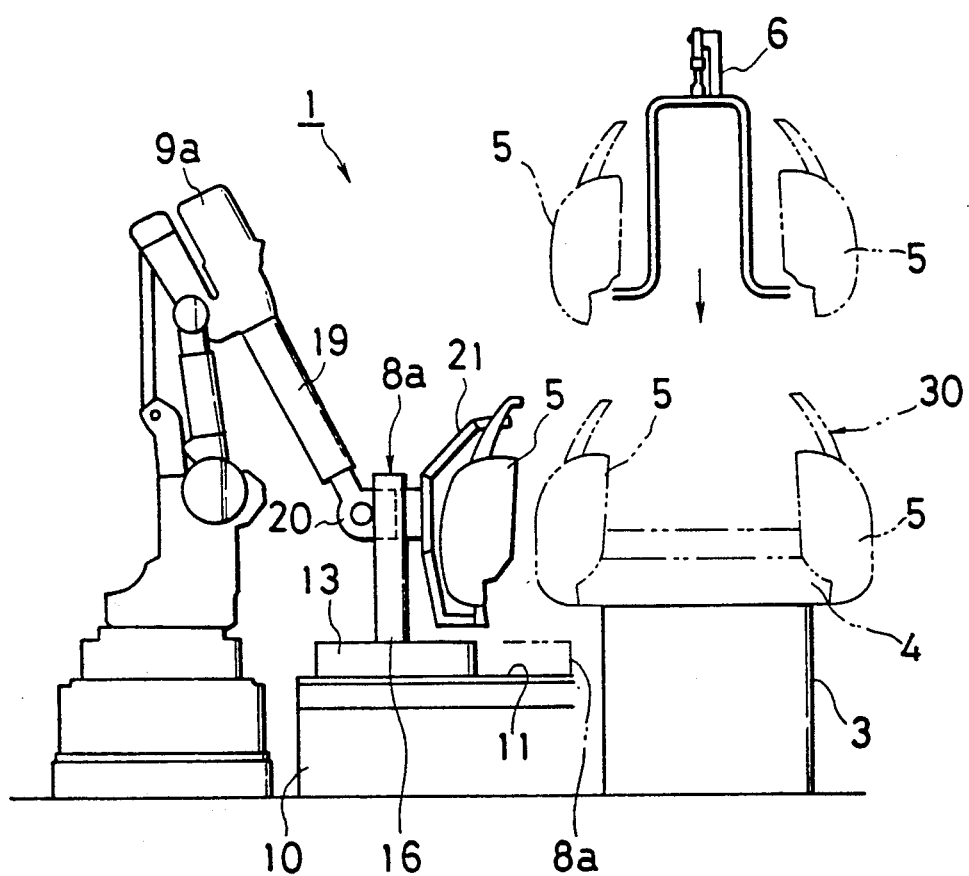
FIG. 3 is a diagrammatic representation of the way of delivering and receiving side body sections in a first station.
Figure 6:
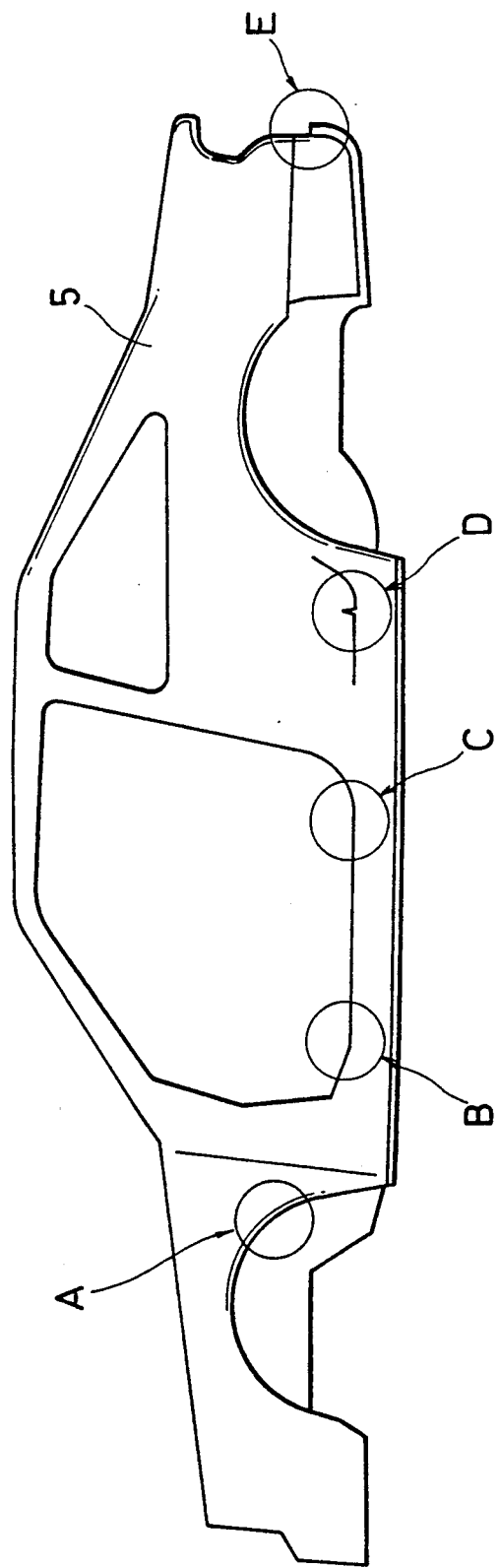
FIG. 6 is a diagrammatic representation showing sits of paw sections on a side body section.
Figure 7:
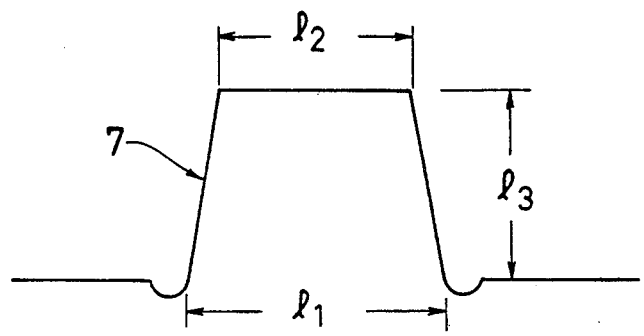
FIG. 7 is an enlarged plan view showing the paw section on the side body section.
Figure 8:
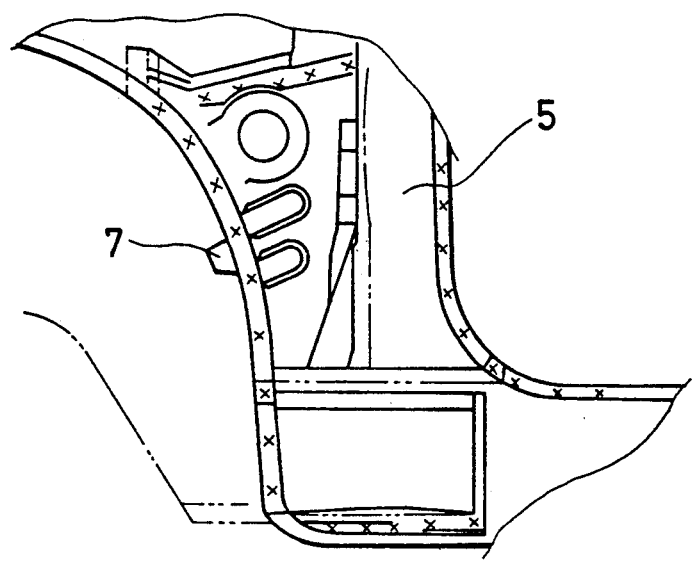
FIG. 8 is an enlarged view showing the section A of FIG. 6.
Figure 9:
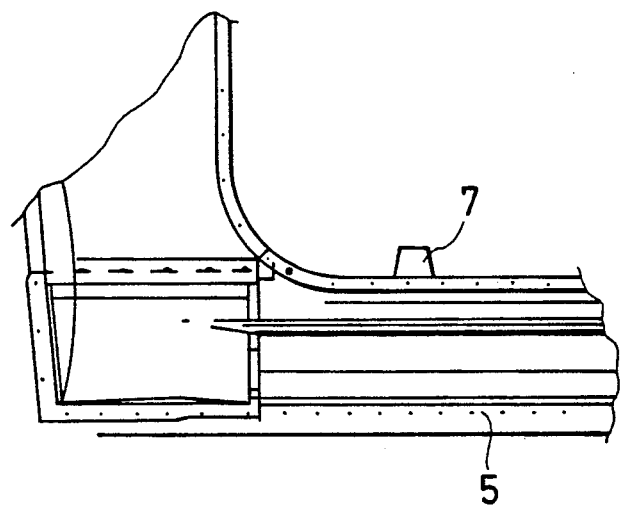
FIG. 9 is an enlarged view showing the section B of FIG. 6.
Figure 10:
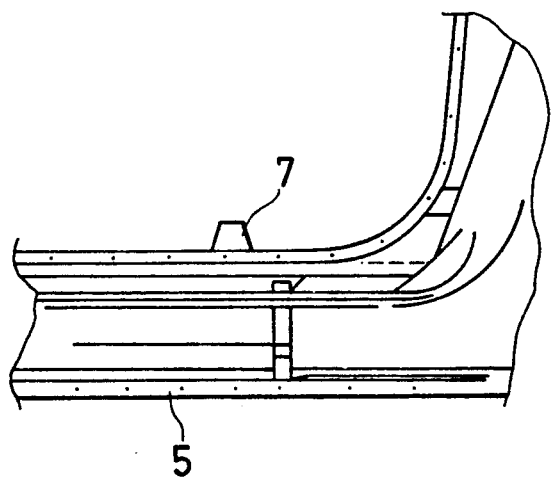
FIG. 10 is an enlarged view showing the section C of FIG. 6.

In the first station 1, as shown in FIGS. 1 to 3, underbody sections 4 are conveyed one after another by the shuttle feeder 3. Further, a pair of left-hand and right-hand side body sections 5 and 5 are conveyed in the first station 1, too, by a hanger unit 6 in a predetermined position above the shuttle feeder 3 in the first station. The side body section 5 may be provided with paws 7 at several sites, for example, as indicated by A, B, C, D and E in FIG. 6, as shown in an enlarged manner in each of FIGS. 7 to 10. The dimension of the paw 7 is set of l1=20 mm and l2=l3=12 mm, as shown in FIG. 7.

Figure 4:
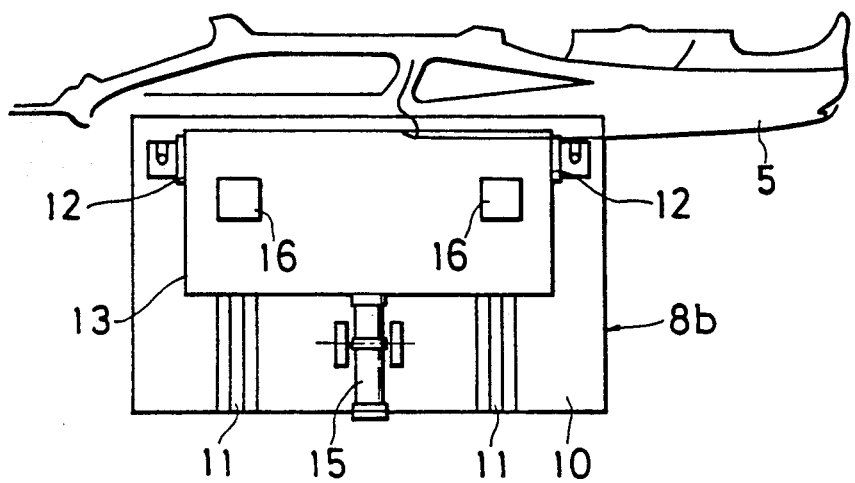
FIG. 4 is a plan view showing an outline of of presetting unit.
Figure 5:
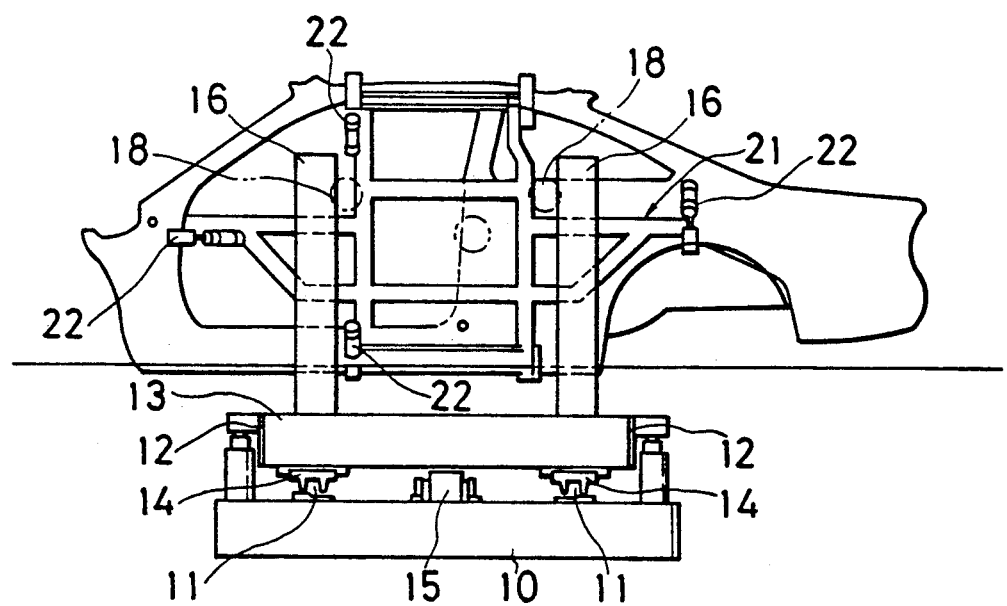
FIG. 5 is a plan view show a state in which a material-handling jig is mounted to the presetting unit.

In the first station, as shown in FIGS. 1 to 3, a presetting unit 8a and a working robot 9a are disposed on one side of and along the shuttle feeder 3, while a presetting unit 8b and a working robot 9b are disposed on the opposite side of and along the shuttle feeder 3. As shown in FIGS. 3 to 5, each of the presetting units 8a and 8b has a base 10 on which a pair of guide rails 11 and a pair of guide plates 12 are provided. The pair of the guide rails 11 are so disposed in a predetermined spaced relationship as to cross the shuttle feeder 3. And the pair of the guide plates 12 are disposed outside the pair of the guide rails 11 yet on the side of the shuttle feeder 3. On the pair of the guide rails 11 is provided a table 13. On the bottom face of the table 13 are so mounted a pair of rails 14 having respective guide grooves as to extend in the direction parallel to the pair of the guide rails 11 and as to allow the guide grooves to be engaged with the respective guide rails 11. This engagement allows the table 13 to approach to or depart from the shuttle feeder 3. The side surfaces of the table 13 are guided by a pair of the guide plates 12 along the guide rails 11 towards the vehicle body 3. To the base 10 is mounted a cylinder unit 15 which in turn is connected to the table 13, thereby applying a driving force for transferring the table 13. The table 13 has a pair of supports 16 and 16 disposed upright, and a chuck unit 18 is mounted to the pair of the supports 16 and 16 so as to fix material-handling jigs 21 thereto, as will be described hereinafter, although not shown in FIG. 5.

Figure 16:
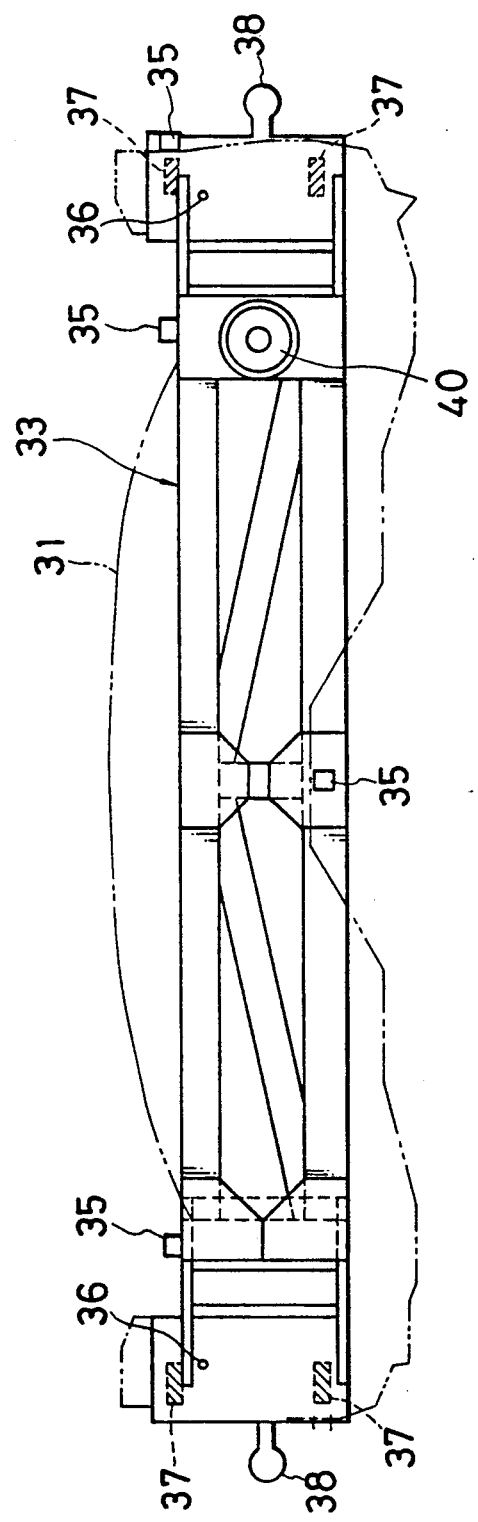
FIG. 16 is a plan view showing the material-handling jig to be employed for the state of mounting the cowl dash.
Figure 17:
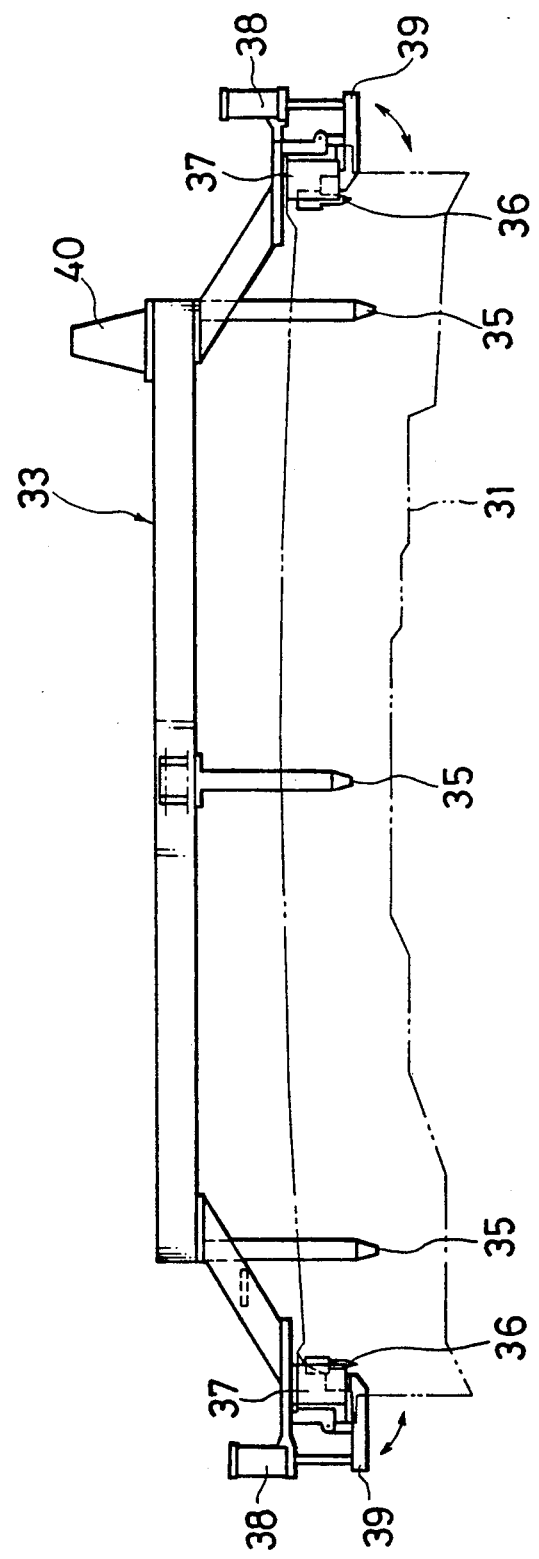
FIG. 17 is a front view of FIG. 16.

As shown in FIG. 3, each of the working robots 9a and 9b has an arm 19 which can be moved freely in every direction. To an end portion of the arm 19 is mounted a clamping section 20, i.e. a robot hand, which is arranged to clamp a variety of material-handling jigs. The material-handling jigs to be employed in this assembly step may include, for example, a material-handling jib 21 for clamping a side body section (FIG. 5), a material-handling jig 41 for clamping a package tray (FIG. 19) and a material-handling jig 33 for clamping a cowl dash (FIGS. 16 and 17).

Each of the working robots 9a and 9b is provided with teaching in a predetermined way so as to implement work in the way as taught previously. Description will not be sequentially made of procedures for assembly in the first station.

As shown in FIGS. 2 and 3, a side body section 5 is conveyed into the first station by hanger unit 6. As the side body section 5 has reached a given position or place of the first section, each of the working robots 9a and 9b is so operated as to pick up and clamp the material-handling jig 21 for clamping the side body section from a station (not shown) where various material-handling jigs are stocked. The side body section 5 is then received and clamped by the material-handling jig 21 from the hanger unit 6. Several types of the material-handling jigs 21 are prepared in advance so as to adapt with various side body sections in accordance with models. As specifically shown in FIGS. 5, each of the material-handling jigs 21 is provided with a plurality of clamping units 22 for appropriately clamping the different types of the side body sections 5. When the material-handling jig 21 has received the side body section, each of the working robots 9a and 9b is operated to deliver it to the respective presetting units 8a and 8b together with the material-handling jig 21, as shown in FIGS. 3 and 5. Then, each of the presetting units 8a and 8b is operated to fix the material-handling jig 21 clamping the side body section 5 to a support 16 through a chuck unit 18 (FIG. 5). As described hereinabove, the side body section 5 is delivered to the presetting unit 8a and 8b through the respective material-handling jig 21, so that the influence upon a decrease in accuracy of alignment or positioning is exerted to a lesser extent than the case in which the side section body 5 itself is delivered. Further, the delivering operation can be performed more smoothly and rapidly.

When each of the presetting units 8a and 8b has received the material-handling jig 21 with the side body section 5 held therewith, a base 13 is allowed to approach to a shuttle feeder 3 in order to align or determine the position of the side body section 5 with respect to an underbody section 4 loaded on the shuttle feeder 3. This alignment is performed on the basis of guiding mechanisms 11, 12 and 14 of each of the presetting units 8a and 8b, so that this operation can achieve highly accurate alignment.

Figure 11:
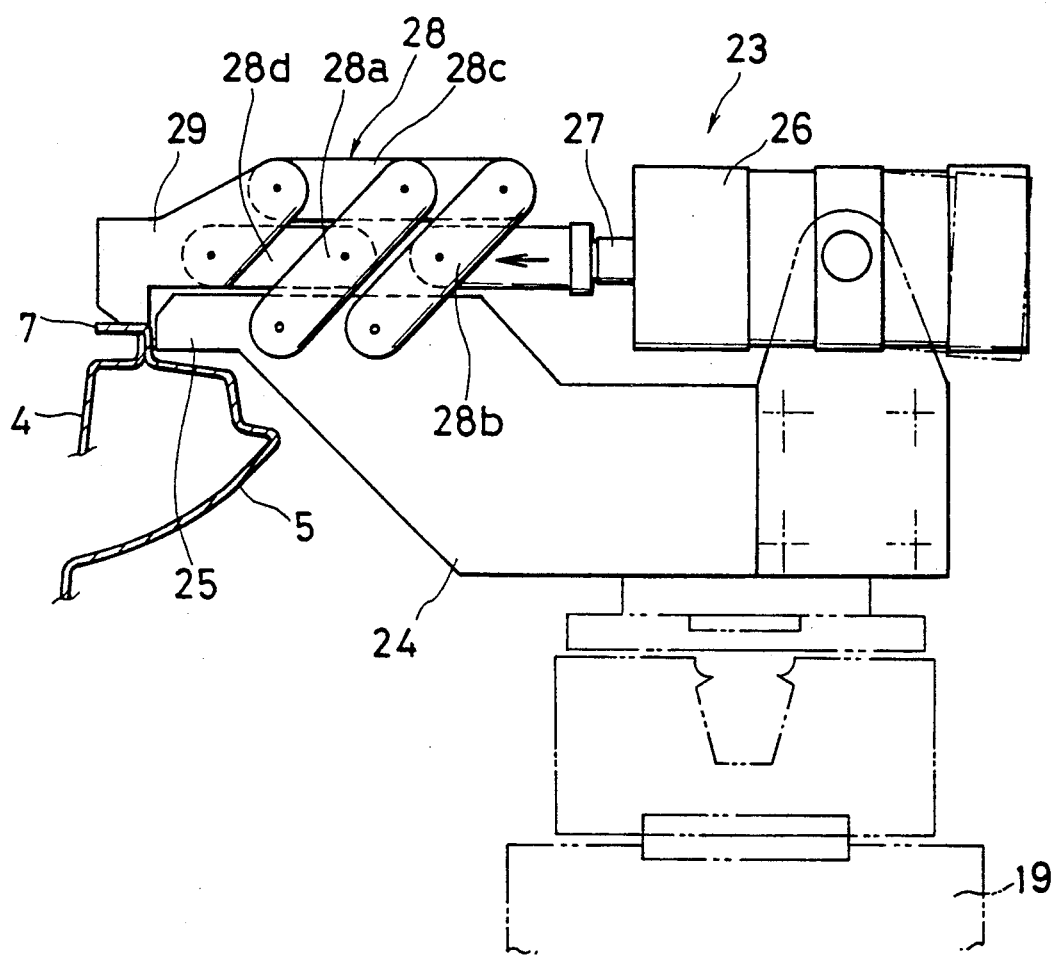
FIG. 11 is a plan view showing a clinching unit.
Figure 12:
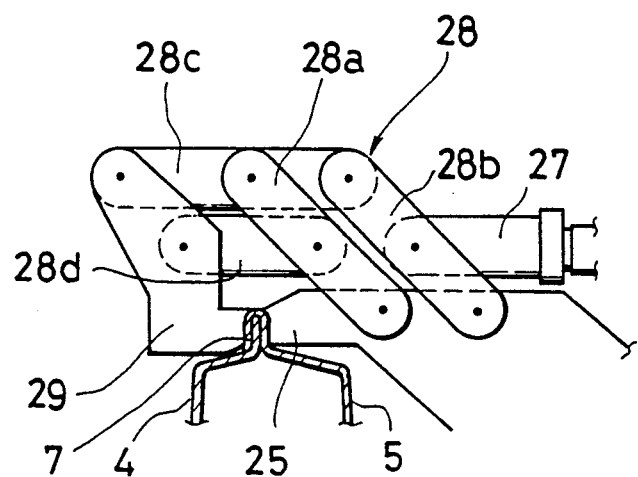
FIG. 12 is a diagrammatic representation showing operation state of FIG. 11.
Figure 13:
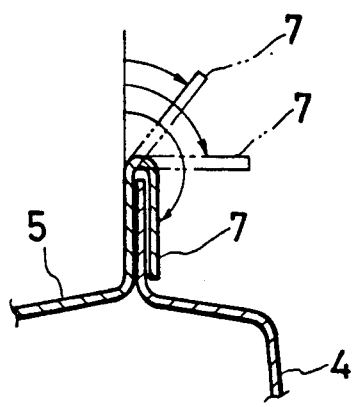
FIG. 13 is a view showing the state of bending of the paw section.

On the other hand, when the working robots 9a and 9b has delivered the material-handling jigs 21 clamping the side body sections 5 to the respective presetting units 8a and 8b, they are then operated to clamp a clinching units 23 as shown in FIG. 11. The clinching unit 23 briefly comprises a bearer 24, a support section 25 projecting from the bearer 24, a cylinder unit 26 held on the bearer 24, and a bending member 29 held by a piston rod 27 of the cylinder unit 26 through a link mechanism 28. When each of the working robots 9a and 9b clamps the clinching unit 23, it transfers the clinching unit 23 to the sites A, B, C, D, E, etc., as shown in FIG. 6, in order, thereby bending each of the paw sections 7 as shown in FIGS. 11 to 13, inclusive. More specifically, at each of the sites A, B, C, D, E, etc., as shown in FIG. 11, each of the working robots 9a and 9b allows the support section 25 of the bearer 24 to come into abutment with a side face of the paw section 7 of the side body section 5 and, thereafter, the piston rod 27 of the cylinder unit 26 is caused to extend, thereby starting pivoting first and second parallel links 28a and 29b, respectively. As the bending member 29 is constructed such that its upper end portion is connected to upper ends of the first and second parallel links 28a and 28b through a first horizontal link 28c and its intermediate portion is connected to an intermediate portion of the first parallel link 28a through a second horizontal link 28d, a pivotal movement of the parallel links 28a and 28b by operation of extending the piston rod 27 of the cylinder unit 26 causes the bending member 29 to start bending the paw section 7 toward the direction of travel of the piston rod 27. When the piston rod 27 is further extended, the paw section 7 is further bended and eventually folded so as to wind a panel portion of the underbody section 4 as shown in FIGS. 12 and 13, thereby temporarily assembling the side body section 5 with the underbody section 4 and leading to a temporarily assembly body 30.

Figure 14:
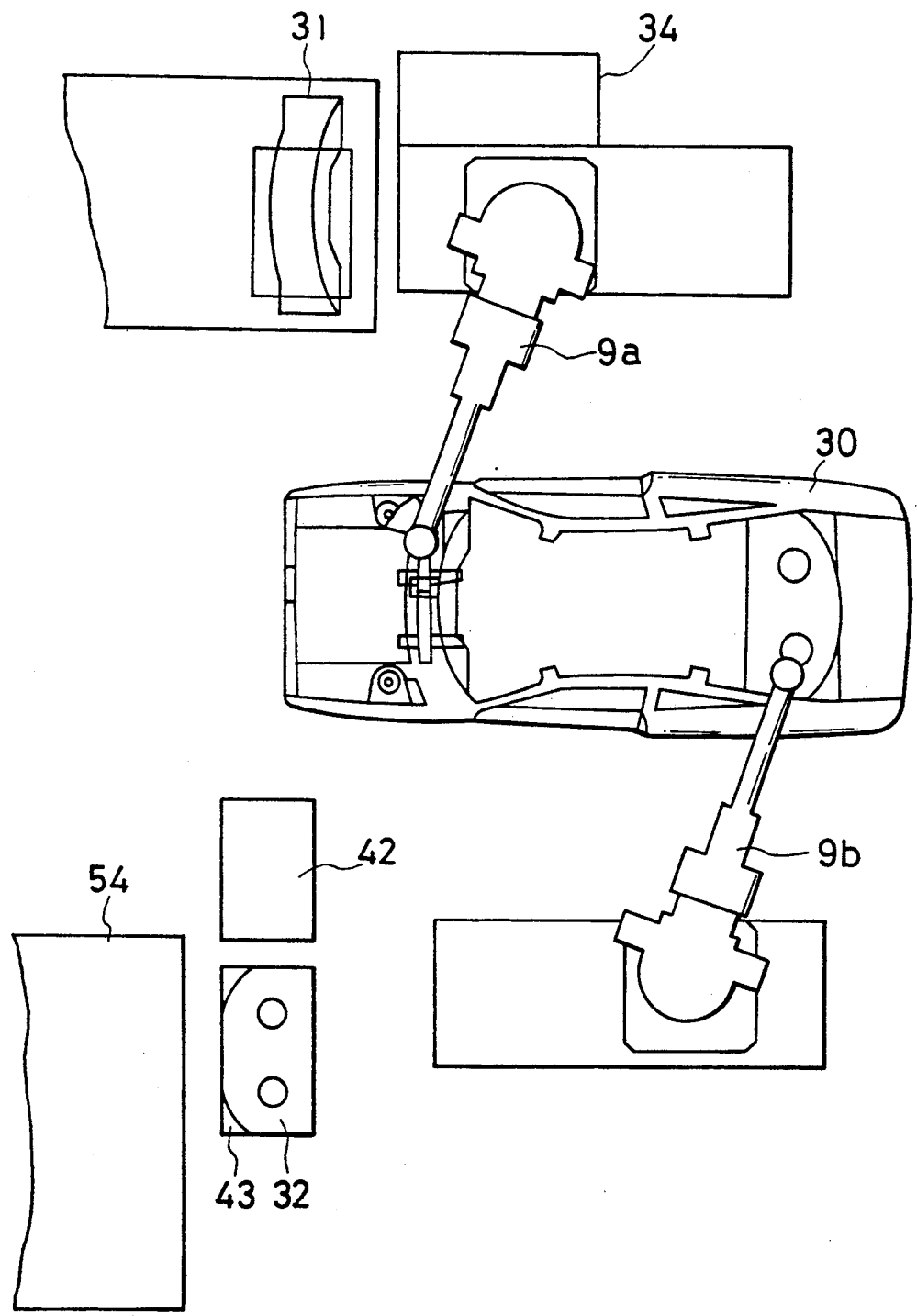
FIG. 14 is a plan view showing the state of mounting a cowl dash and a package tray by a working robot.
Figure 15:
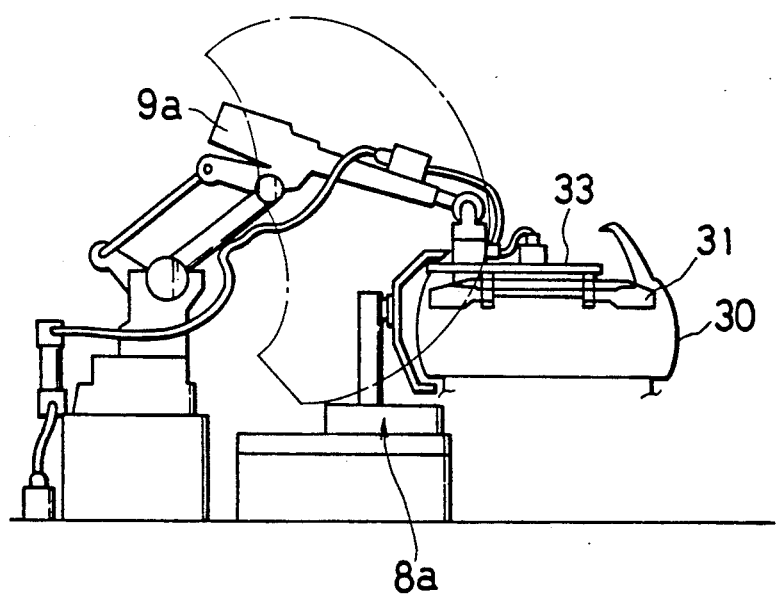
FIG. 15 is a diagrammatic representation of the state of mounting the cowl dash.

When each of the paws 7 at the sites A, B, C, D, E, etc. is bent and wound to thereby form the temporarily assembled body 30, the working robots 9a and 9b detach the clinching unit 23 and the working robot 9a starts mounting the cowl dash 31 to the temporarily assembled body 30 while the other working robot 9b starts mounting the package tray thereto, as shown in FIG. 14.

Description will then be made of the mounting of the cowl dash 31 by the working robot 9a with reference to FIGS. 1 and 14-17. First, the working robot 9a clamps the material-handling jig 33 for clamping the cowl dash in a stock yard for material-handling jigs and thereafter the material-handling jig 33 clamps the cowl dash 31. As shown in FIGS. 16 and 17, the material-handling jig 33 is of a long-length member, which has plural guide pins 35 and guide pins 36 so mounted on its lower face portion as to align the cowl dash 31 with the material-handling jig 33. The cowl dash 31 has an aligning hole formed in advance so as to correspond to the guide pin 33. The material-handling jig 33 has a pressing portion 37 and an opening/closing paw 39 to be drivable by a cylinder unit 38 at both end portions in the lengthwise direction of the material-handling jig 33, thereby allowing the pressing portion 37 and the opening/closing paw 39 to hold the aligned cowl dash 31. In FIGS. 16 and 17, reference numeral 40 denotes a portion to be clamped by the working robot 9a.

When the working robot 9a clamps the material-handling jig 33 and the material-handling jig 33 in turn holds a cowl dash 31, the working robot 9a mounts only the cowl dash 31 to the front portion of the temporarily assembled body 30. Then, the working robot 9a is returned to the stock yard for the material-handling jigs in the state in which the material-handling jig 33 is clamped, and it unclamps and returns the material-handling jig 33. Thereafter, the working robot 9a is returned to its original position for receiving a fresh side body section 5 from a hanger unit 6.

Figure 19:
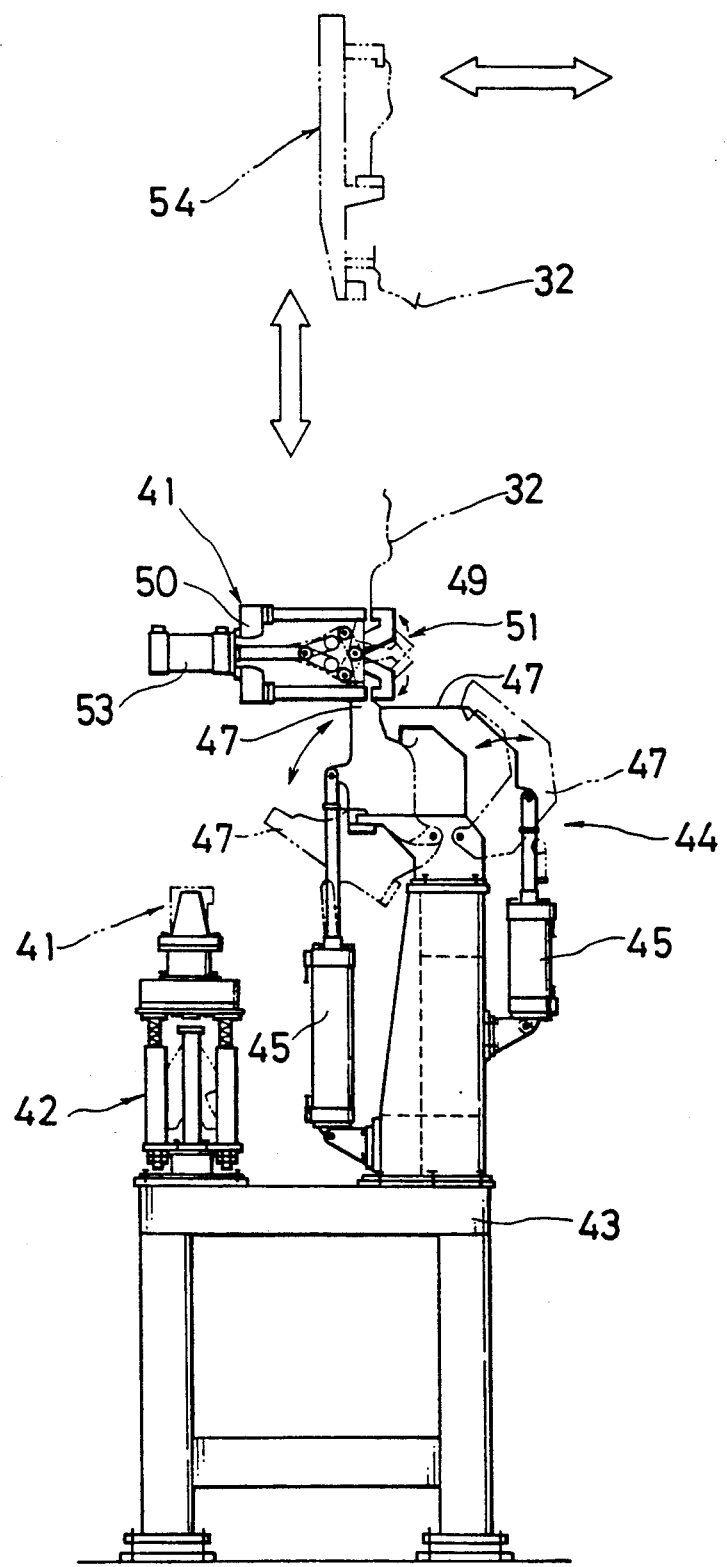
FIG. 19 is a front view showing a package tray holding unit.
Figure 20:
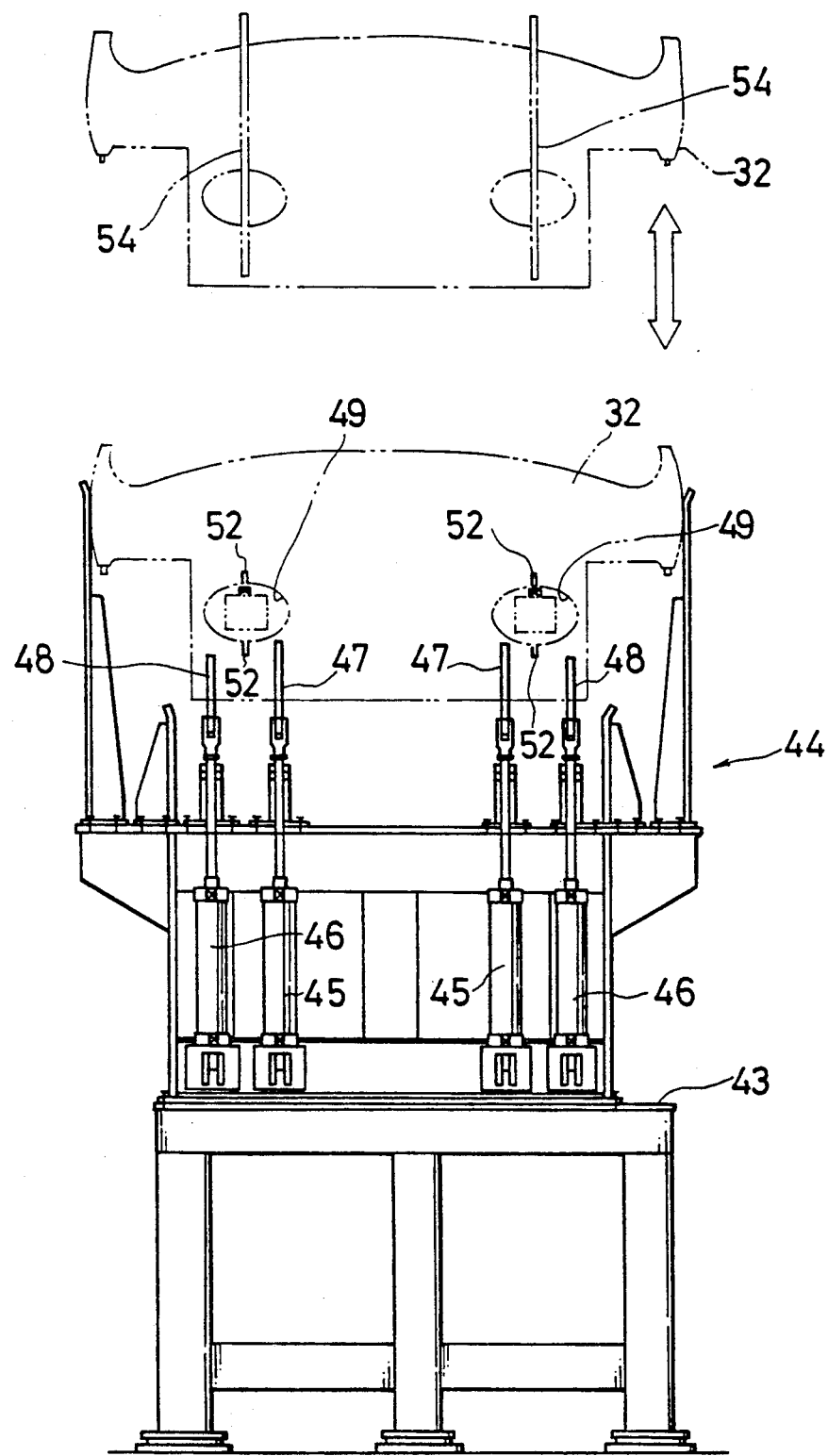
FIG. 20 is a left side view of FIG. 19.

Description will now be made of the mounting of the package tray 32 to a predetermined position of the temporarily assembled body 30 by another working robot 9b, with reference to FIGS. 1, 14 and 18-20. The working robot 9b clamps a material-handling jig 41 for clamping the package tray at a stock table 42 for material-handling jigs and picks up a package tray 32 from a stock table 43 for package trays through the material-handling jig 41. Specifically speaking, as shown in FIGS. 19 and 20, the stock table 43 for package trays is provided with a unit 44 for holding package trays, which has clampers 47 and 48, each being drivable by cylinder units 45 and 46, respectively. The package tray 32 is held by the clampers 47 and 48 in such a state that its plate face is allowed to stand upright. In this embodiment, the unit 44 for holding package trays is provided with two different kinds of clampers, one being for a package tray of a four-door car and the other being for a package tray of a two-door car, thereby allowing selection of clampers in accordance with the kind or model of the package tray 32. FIGS. 19 and 20 show the state in which the package tray for a four-door car is held by the clampers. The material-handling jig 41 is so constructed as to utilize a hole 49 of the package tray 32 as shown in FIG. 19. More specifically, the material-handling jig 41 has a pair of paw mechanisms 51 which are so disposed on a long-length base plate 50 as to be extensible and contractible and as to correspond to the hole 49 of the package tray 32. The paw mechanism 51 is inserted into the hole 49 of the package tray 32 in its contracted state and then extended to open after insertion, thereby allowing the paw mechanism 51 and the portion not inserted into the hole 49 of the package tray to hold the package tray 32 which has been caused to stand upright by the units 44 for holding the package tray. In FOG. 20, reference numeral 52 denotes the position in which the package tray is held and reference numeral 53 denotes a cylinder unit for driving the paw mechanism 51, which is clamped by the working robot 9b. Reference numeral 54 denotes a unit for withdrawing the package tray which supplies the package tray 32 one after another to the unit 44 for holding the package tray.

Figure 18:
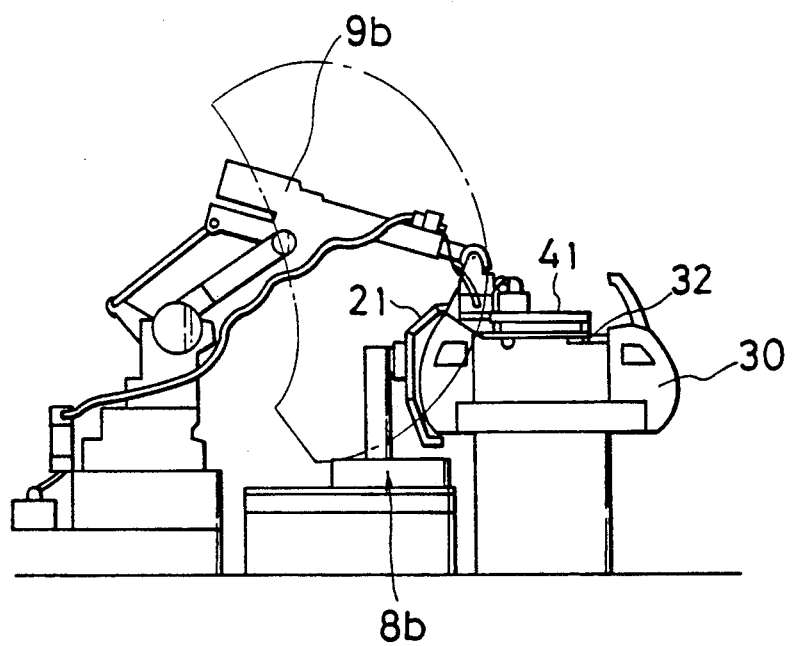
FIG. 18 is a diagrammatic representation of the state of mounting the package tray.

As the working robot 9b clamps the material-handling jig 41 and the material-handling jig 41 holds the package tray 32, the unit 44 for holding the package tray releases the package tray 32, thereby allowing only the package tray 32 to be mounted to a rear portion of the temporarily assembly body 30, as shown in FIGS. 14 and 18. In FIG. 18, the dot-dash line indicates a locus of travel of the material-handling jig 1. Thereafter, the working robot 9b is returned to the stock table 42 for material-handling jigs in the state in which the material-handling jig 41 is clamped, and then unclamps the material-handling jig 41 and removes it, followed by the return to its original position for receiving a fresh side body section 5 from a hanger unit 6.

Then, description will be made of the second station with reference to FIGS. 1, 2, and 21-24. After the mounting of the package tray 32 and the cowl dash 31, the temporarily assembled body 30 is then conveyed by the shuttle feeder 3 to the predetermined position in the second station.

On the both sides between the predetermined position of the second station are disposed an alignment unit 55 and a welding robot 56 as shown in FIG. 1.

Figure 21:
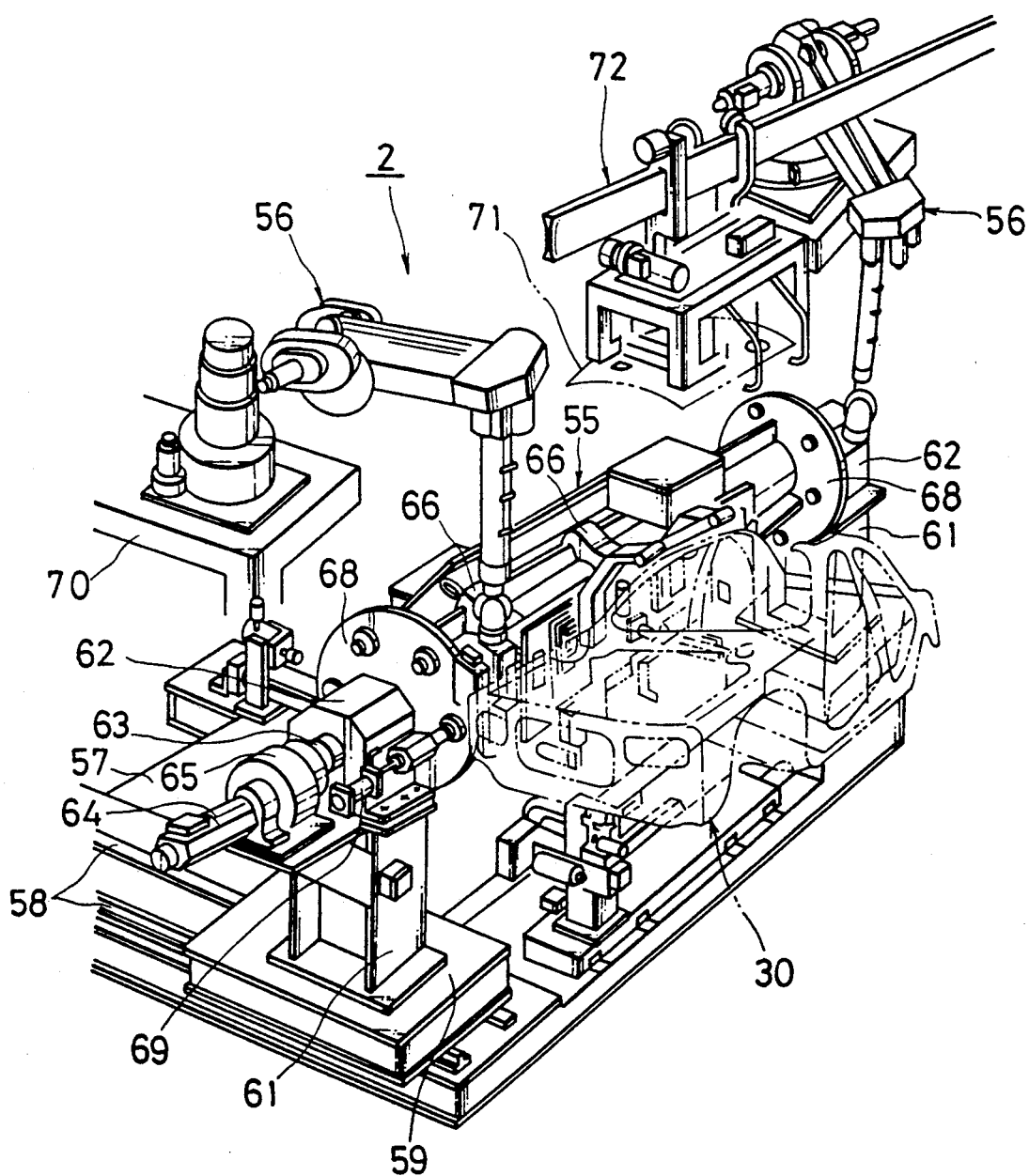
FIG. 21 is perspective view showing a second station.
Figure 22:
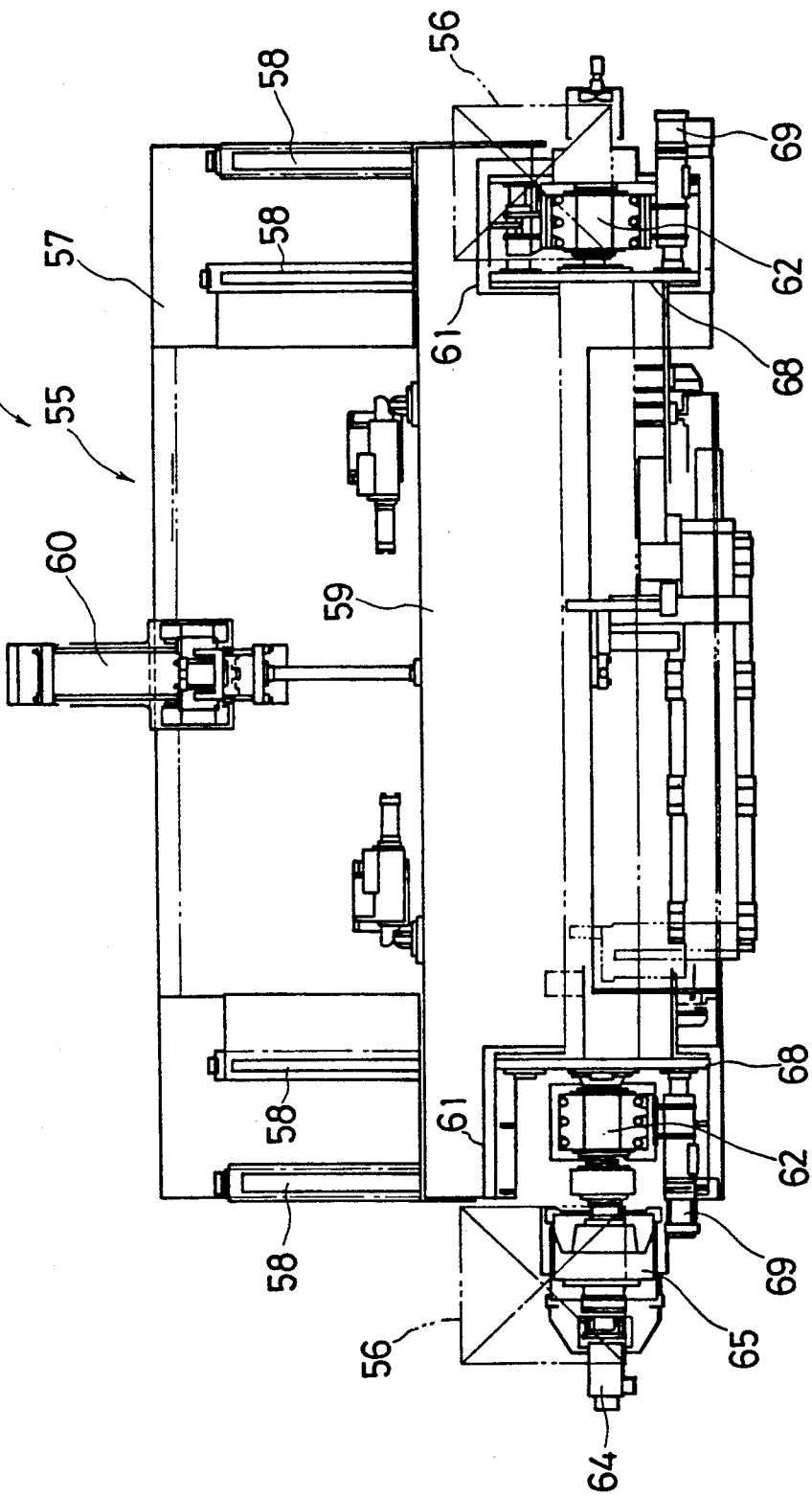
FIG. 22 is a plan view showing one side of the second station when looked on the basis of a shuttle feeder.
Figure 23:
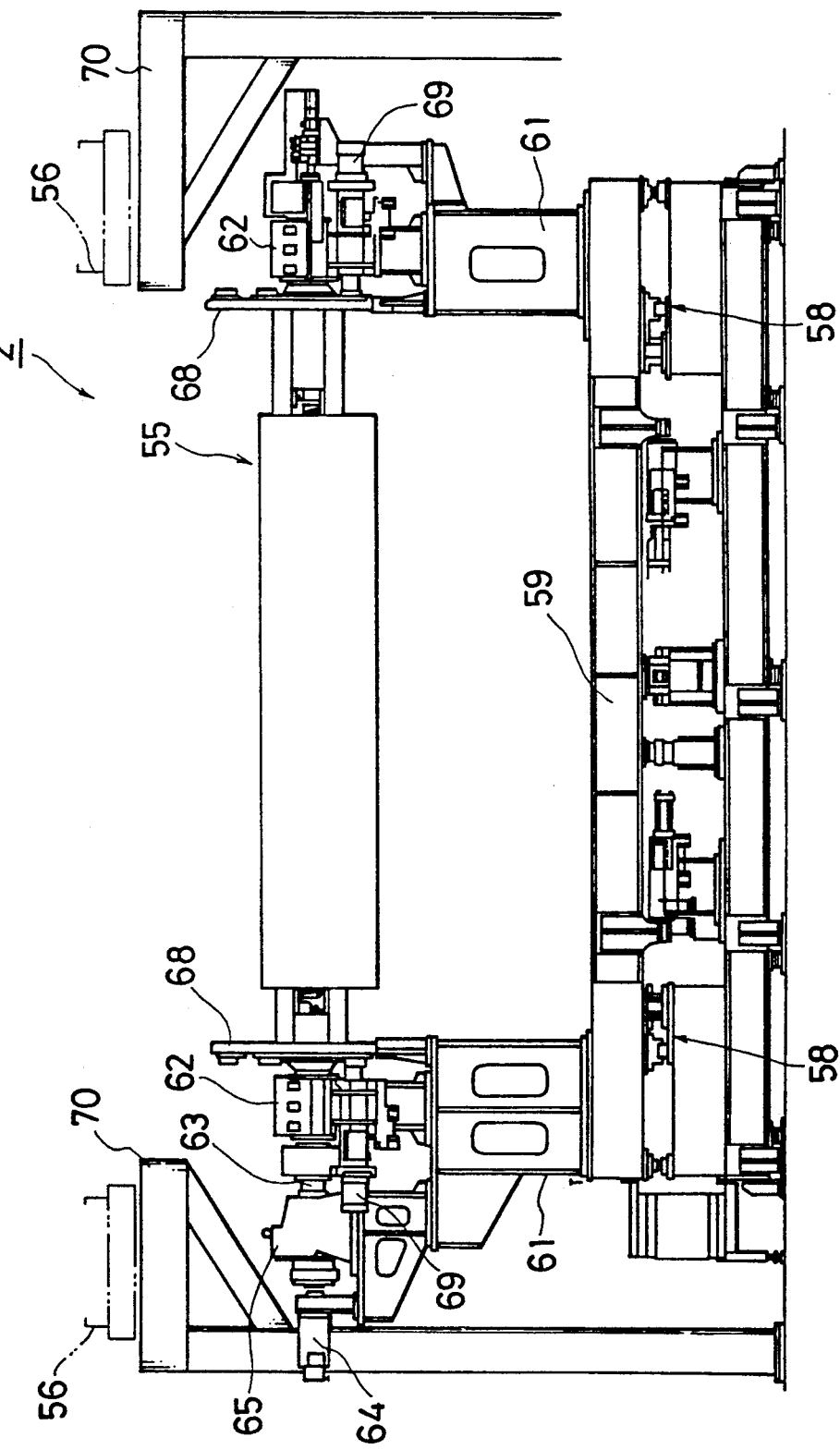
FIG. 23 is front view of FIG. 22.
Figure 24:
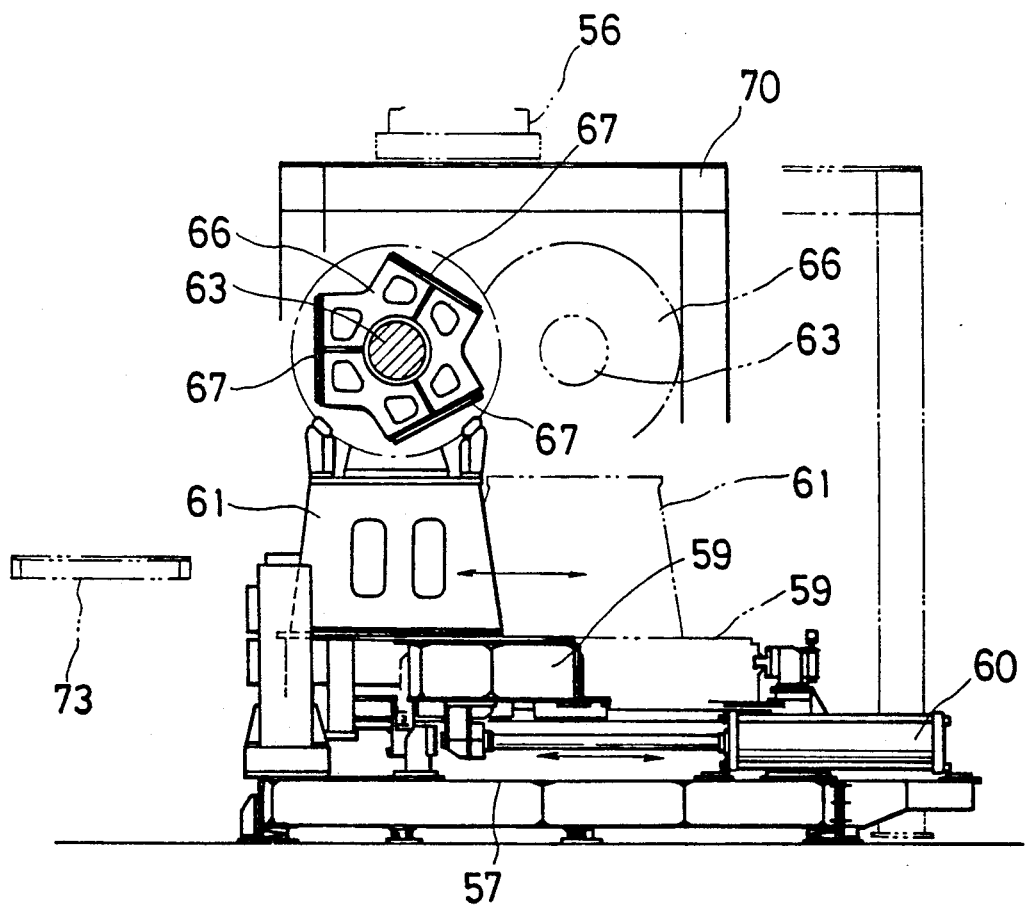
FIG. 24 is right side view of FIG. 22.

As shown in FIG. 21, the alignment unit 55 has a sliding base 59 disposed on a fixed base 57 through a guide rail 58, as shown in FIG. 21. The sliding base 59 is drivable by a cylinder unit 60 and so as to approach to or depart from the shuttle feeder 3 along the guide rail 58, as shown in FIGS. 22 and 24.

On each of the sliding bases 59 is mounted a support base 61 on each of the both sides extending in the direction in which the shuttle feeder 3 travels, and the support base 61 has a bearing 62 which in turn rotatably supports a rotary shaft 63 to which a rotational force of a motor 64 is transmitted through a decelerator 65. The rotary shaft 63 has a plurality of bases 66 for mounting jigs, as shown in FIGS. 21 and 24. In this embodiment, the base 66 for mounting the jig is provided with three mounting faces 67 on its peripheral face, as shown in FIG. 24. To each of the mounting faces 67 is mounted a jig (not shown) so as to adapt with the kind or model of the automotive vehicle, each of the jigs being so arranged as for plural clampers for alignment, etc. (not shown) to be employed for alignment. The jig is determined by a rotary plate 68 disposed on the rotary shaft 63 and a piston rod of the cylinder unit 69 in the position in which the sliding base 59 is travelled rearwards (as indicated by the phantom line in FIG. 24). Then, the determined jig is then located in the advancing position in which the temporarily assembled body 30 is aligned by the plural clampers, etc. mounted to the jig. The jig, clampers, etc. for the alignment unit 55, are per se known so that description thereof will be omitted from the following explanation.

The welding robot 56 will then be described. A base frame 70 is disposed on each of the both sides of the alignment unit 55 as shown on the left and right sides of the unit 55 in FIG. 23 and the welding robot 56 is mounted to the base frame 70.

The welding robot 56 is operated after the temporarily assembled body 30 has been aligned in its predetermined position by the alignment unit 55. The welding robot 56 is then operated to weld the package tray 32, the cowl dash 31 and so on at the predetermined sites of the temporarily assembled body 30.

Further, in the second station, a roof section 71 is mounted to the temporarily assembled body 30. In FIG. 21, reference numeral 72 denotes a conveying unit for conveying the roof section 71. In FIG. 24, reference numeral 73 denotes a jig for a carrier conveying an underbody section.

The conveying unit 72 conveys the temporarily assembled body 30 from the first station 1 to the second station 2 one after another after the temporarily assembled body 30 has been formed by the side body section 5 and the underbody section 4 in the first station 1. This allows the temporarily mounting operation for the temporarily assembled body 30 in the first station 1 and the welding work by the welding robot 56 in the second station to be carried out on the assembly line. Therefore, the welding robot 56 is not required to wait after having the conveying and aligning work done and can weld the temporarily assembled body 30 conveyed without rest, thereby improving work efficiency of the welding robot 56 to a great extent.

Further, it is to be noted that, as the temporary assembly operation, including the conveying and aligning work, and the welding operation are implemented in different stations, the temporary assembly operation can be designed and carried out in the first station without paying great attention to the welding operation, while the welding operation can be carried out in the second station without paying great attention to the temporary assembly operation in the first station. This can allow a control system to be designed and performed in the ay peculiar to each of the stations, thereby simplifying control over work in each of the stations.

Furthermore, in the first station, the package tray 32 and the cowl dash 31 can be mounted to the temporarily assembled body 30 by utilizing the working robots 9a and 9b, thereby further taking effective advantage of the working robots 9a and 9b and, as a result, shortening rest time of the working robots 9a and 9b. Therefore, the work efficiency of the working robots 9a and 9b can also be improved, as well as the welding robot 56.

In the first station, too, the alignment is performed by the presetting units 8a and 8b which are so disposed as to be guided and moved merely in a reciprocal fashion, thereby performing highly accurate alignment and forming the temporarily assembled body 30 in a highly accurate state. Further, as the temporarily assembled body 30 is assembled in a highly accurate way, burdens to be imposed upon the alignment of the alignment unit 55 can be reduced to a considerable extend in welding in the second station.

Although the present invention is described by way of example, it is to be understood that it encompasses the following embodiments:

1. A plurality of second stations can be provided in order to compete with an increase in models of automotive vehicles.

2. Structuring parts to be mounted by the working robots 9a and 9b may include, for example, structuring parts, other than the package trays and the cowl dashes.

3. The arrangement of this invention can be applied to the welding of the side body section to a roof panel as well as to the underbody section.

The present invention may be embodied in other specific forms without departing from the spirit and scope thereof. The present embodiments as described hereinabove are therefore to be considered in all respects as illustrative and not restrictive, the scope of the invention being indicted by the appended claims, and all the changes, modifications and variations which come within the meaning and range of equivalency of the claims are therefore intended to be encompassed within the spirit and scope of the invention.

What is claimed is:

1. An assembly line for assembling an automotive vehicle body, comprising:
   a welding station disposed in a vehicle body assembly line for welding a first member and a second member, each being a structural element of the automotive vehicle body; and
   an assembling station disposed in the vehicle body assembly line immediately upstream from the welding station for aligning the first member with the second member and for temporarily assembling the first member with the second member to form a temporarily assembled body;
   wherein the assembling station has a presetting unit for aligning the first member with the second member and an assembling unit for temporarily assembling the first member with the second member;
   wherein at least one of the first member and the second member is provided with plural paw sections; and
   wherein the assembling unit assembles the first member temporarily with the second member by folding the plural paw section provided on at least one of the first member and the second member.

2. An assembly line as claimed in claim 1, wherein the assembling unit includes a working robot.

3. An assembly line as claimed in claim 1, wherein:
the first member is an under-body section of the automotive vehicle body; and
the second member is a side section of the automotive vehicle body.

4. An assembly line as claimed in claim 3, further comprising:
first conveyor means, disposed on a floor of the vehicle body assembly line, for conveying the under-body section to the assembling station; and
second conveyor means for conveying the side section to the assembling station.

5. An assembly line as claimed in claim 4, wherein the second conveyor means includes a hanger conveyor system for conveying the side section in a suspended state.

6. An assembly line as claimed in claim 4, further comprising a transferring unit for transferring the side section from the second conveyor means to the presetting unit.

7. An assembly line as claimed in claim 6, wherein:
the second conveyor means conveys the side section to the assembling station in a state in which the side section is set to a jig; and
the transferring unit transfers the side section with the jig set thereto from the second conveyor means to the presetting unit.

8. An assembly line as claimed in claim 7, where the presetting unit is on each of right and left sides of the first conveyor means and is driven operatively so as to move close to or apart from the first conveyor means along a guide rail.

9. An assembly line as claimed in claim 7, wherein the assembling unit and the transferring unit are composed of a common robot.

10. An assembly line as claimed in claim 9, wherein the common robot and the presetting unit are both on each of right and left sides of the first conveyor means.

11. An assembly line for assembling an automotive vehicle body, comprising:
a welding station disposed in a vehicle body assembly line for welding a first member and a second member, each being a structural element of the automotive vehicle body; and
an assembling station disposed in the vehicle body assembly line immediately upstream from the welding station for aligning the first member with the second member and for temporarily assembling the first member with the second member to form a temporarily assembled body;
wherein the welding station has an aligning unit for aligning the temporarily assembled body conveyed into the welding station and a welding robot for welding the first member to the second member;
wherein the aligning unit is movable so as to assume a plurality of positions in accordance with different types of temporarily assembled bodies; and
wherein the welding robot is disposed so as to be movable integrally with the aligning unit.

12. An assembly line as claimed in claim 11, wherein:
the first member is an under-body section of the automotive vehicle body; and
the second member is a side section of the automotive vehicle body.

13. An assembly line as claimed in claim 12, wherein:
the temporarily assembly body is further temporarily assembled with a cowl dash panel in the assembling station; and
the cowl dash panel is welded to the temporarily assembled body by the welding robot in the welding station.

14. An assembly line as claimed in claim 12, wherein:
the temporarily assembled body is further temporarily assembled with a package tray in the assembling station; and
the package tray is welded to the temporarily assembled body by the welding robot in the welding station.

15. An assembly line as claimed in claim 12, wherein:
the temporarily assembly body is further temporarily assembled with a cowl dash panel and a package tray in the assembling station; and
the cowl dash panel and the package tray are then welded to the side section by the welding robot in the welding station.

16. An assembly line as claimed in claim 15, wherein a roof section conveyed into the welding station is welded to the side section by the welding robot.

17. An assembly line as claimed in claim 1, wherein the assembling unit is a working robot, and wherein the working robot operatively assembles a third member with the temporarily assembled body.

18. An assembly line as claimed in claim 17, wherein:
the first member is an under-body section of the automotive vehicle body; and
the second member is a side section of the automotive vehicle body.

19. An assembly line as claimed in claim 18, wherein the third member is a cowl dash panel.

20. An assembly line as claimed in claim 18, wherein the third member is a package tray.

21. An assembly line as claimed in claim 18, further comprising:
first conveyor means disposed in a floor of the vehicle body assembly line for conveying the under-body section to the assembly station; and
second conveyor means for conveying the side section to the assembly station;
wherein the assembling station has a presetting unit and a working robot on each of right and left sides of the first conveyor means; and
wherein the working robot transfers the side section from the second conveyor means to the assembling station to the presetting unit.

22. An assembly line as claimed in claim 21, further comprising a third conveyor means for conveying the third member to the assembling station.

23. An assembly line as claimed in claim 22, wherein:
the third member is composed of a cowl dash panel and a package tray;
the working robot disposed on one side of the first conveyor means assembles the cowl dash panel the temporarily assembled body; and
the working robot disposed on the other side of the first conveyor means assembles the package tray to the temporarily assembled body.

24. An assembly line as claimed in claim 11, wherein the assembling station has a presetting unit for aligning the first member with the second member and a working robot for temporarily assembling the first member with the second member, and wherein the working robot operatively assembles a third member with the temporarily assembled body.

25. An assembly line as claimed in claim 24, wherein the first member is an under-body section of the automotive vehicle body; and the second member is a side section of the automotive vehicle body.

26. An assembly line as claimed in claim 25, wherein the third member is a cowl dash panel.

27. An assembly line as claimed in claim 25, wherein the third member is a package tray.

28. An assembly line as claimed in claim 25, further comprising:

first conveyor means disposed on a floor of the vehicle body assembly line for conveying the under-body section to the assembly station; and second conveyor means for conveying the side section to the assembling station;

wherein the assembling station has a presetting unit and a working robot on each of right and left sides of the first conveyor means; and wherein the working robot transfers the side section from the second conveyor means to the assembling station to the presetting unit.

29. An assembly line as claimed in claim 28, further comprising a third conveyor means for conveying the third member to the assembling station.

30. An assembly line as claimed in claim 29, wherein:

the third member is composed of a cowl dash panel and a package tray;

the working robot disposed on one side of the first conveyor means assembles to cowl dash panel to the temporarily assembled body; and the working robot disposed on the other side of the first conveyor means assembles the package tray to the temporarily assembled body.

* * * * *